United States Patent
Ogawa

(10) Patent No.: US 9,201,873 B2
(45) Date of Patent: Dec. 1, 2015

(54) OPERATION DEVICE, IMAGE FORMING APPARATUS, OPERATION METHOD, AND COMPUTER-READABLE NON-TRANSITORY STORAGE MEDIUM

(71) Applicant: KYOCERA Document Solutions Inc., Osaka-shi, Osaka (JP)

(72) Inventor: Tomohiro Ogawa, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/338,203

(22) Filed: Jul. 22, 2014

(65) Prior Publication Data
US 2015/0032439 A1     Jan. 29, 2015

(30) Foreign Application Priority Data
Jul. 26, 2013   (JP) ................................ 2013-155235

(51) Int. Cl.
*G06F 17/28*     (2006.01)
*G06F 9/44*     (2006.01)
*G06F 3/12*     (2006.01)

(52) U.S. Cl.
CPC ............ *G06F 17/289* (2013.01); *G06F 9/4448* (2013.01)

(58) Field of Classification Search
CPC ... G06F 17/28; G06F 17/2809; G06F 17/289; G06F 17/2872; G06F 17/4448
USPC ........ 358/1.1, 1.4, 1.5, 1.9, 1.11–1.18; 704/2, 704/277
See application file for complete search history.

(56) References Cited

FOREIGN PATENT DOCUMENTS

JP     2003157272 A     5/2003

*Primary Examiner* — Thierry L Pham
(74) *Attorney, Agent, or Firm* — Alleman Hall McCoy Russell & Tuttle LLP

(57) ABSTRACT

Operation device which, when user selects predetermined language key, switches display character sets of display language displayed on screen to translated character sets of translation language specified by predetermined language key. Operation device includes language switch portion and display character retrieval portion. Language switch portion judges whether all translated character sets of translation language specified by selected language key exist in correspondence with display character sets. Display character retrieval portion checks whether same character set as display character set of display language corresponding to missing translated character set exists in other display character sets of display language when not all translated character sets exist. When same character set as display character set of display language exists in other display character sets, language switch portion substitutes another translated character set of translation language, which corresponds to same character set that exists in other display character sets, for missing translated character set.

6 Claims, 8 Drawing Sheets

F I G. 4
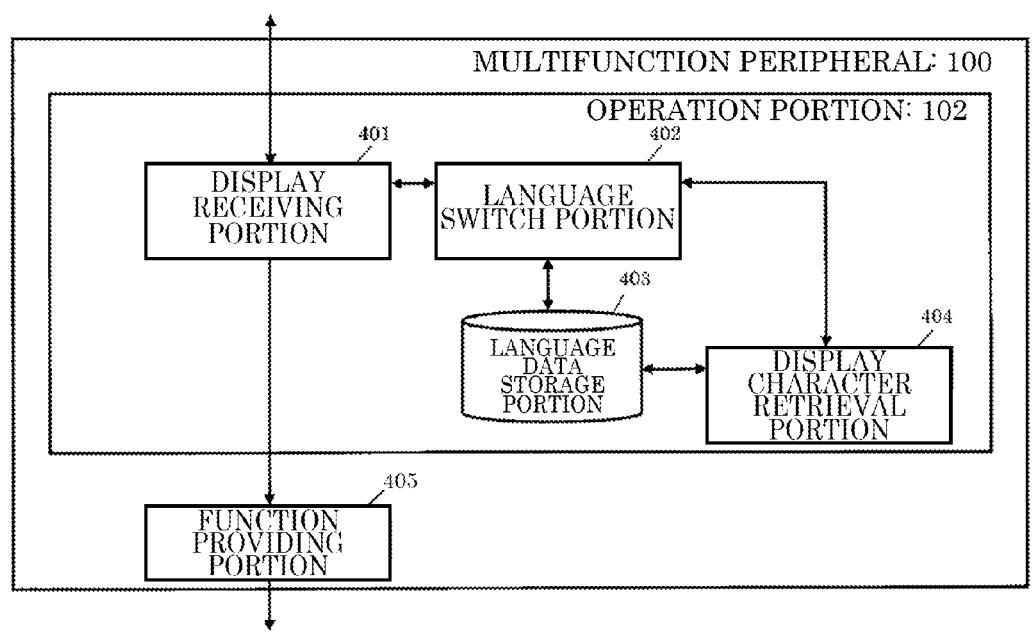

OPERATION DEVICE, IMAGE FORMING APPARATUS, OPERATION METHOD, AND COMPUTER-READABLE NON-TRANSITORY STORAGE MEDIUM

INCORPORATION BY REFERENCE

This application is based upon and claims the benefit of priority from the corresponding Japanese Patent Application No. 2013-155235 filed on Jul. 26, 2013, the entire contents of which are incorporated herein by reference.

BACKGROUND

The present disclosure relates to an operation device, an image forming apparatus, an operation method, and a computer-readable non-transitory storage medium by which even when a translated character set of a translation language is missing, an existing translated character set can be substituted for the missing translated character set.

There are known many conventional technologies concerning translation performed by an operation portion of an image forming apparatus such as a copier, a multifunction peripheral, a printer or the like. For example, as a typical technology, there is known a translated publication providing system including a terminal device and a server. The terminal device includes: an input portion for inputting image data in which an identifier (ID) is embedded in a digital watermarking format, an input portion for inputting the specification of a translation language; and a transmission portion for transmitting the input image data and translation language specification to a server. The server includes a receiving portion, an extracting portion, a database, a retrieving portion, a synthesizing portion, and an output portion. The receiving portion receives the image data from the terminal device. The extracting portion extracts the ID in the digital watermarking format and the translation language specification from the received image data. The data base stores a plurality of groups of respective image-related data having at least page data and translated sentence data based on respective translation languages as elements and IDs corresponding to respective image-related data. The retrieving portion retrieves each image-related data corresponding to the extracted ID from the database. The synthesizing portion synthesizes the retrieved page data and the translated sentence data of the specified translation language to generate a translation page. The output portion outputs the translation page. In this structure, an identifier is embedded in image data in a digital watermarking format. This prevents impairing of the design of the printed document. Also, with this structure, the server extracts the ID in the digital watermarking format from the image data. This spares the terminal device of the need to be loaded with software for the extraction. Thus, this structure does not reduce the capacity of the storage of the terminal device. Nor does it require the terminal device to have an excessive CPU performance. Furthermore, since the version upgrade of the software is completed only with the version upgrade of the software installed in the server, the hand of the user is not bothered.

Meanwhile, to support a plurality of regions in the world, in the above-mentioned typical image forming apparatus, a plurality of translation languages are set such that the display language can be switched from a standard display language to any of the translation languages. For example, English may be set as the display language and German, French, Spanish, Italian, Netherlandish, Russian, languages in Asia (Japanese, Chinese, Korean, etc.) and other languages may be set as the translation languages in the image forming apparatus.

Here, the translation languages include: a standard translation language that is determined in advance; and optional translation languages that can be selected arbitrarily by the user. In general, the optional translation languages are set by the manufacturer or the administrator installing the language data of predetermined translation languages in correspondence with regions in which the image forming apparatus is sold or installed.

The language data (also referred to as firmware) of the optional translation languages is managed differently from the language data of the standard translation language. For example, when the display language of the operation portion in the image forming apparatus is renewed, the language data of the standard translation language is automatically updated in correspondence with functions that have been added newly by the renewal. On the other hand, the language data of the optional translation languages is not automatically updated, and the administrator or the like needs to install new language data in correspondence with the additional functions. This is because, in general, the language data of the standard translation language is not compatible with the language data of the optional translation languages, and thus, even when the language data of the standard translation language is updated, the language data of the optional translation languages is not updated appropriately.

SUMMARY

One aspect of the present disclosure is directed to an operation device which, when a user selects a predetermined language key, switches display character sets of a display language displayed on a screen to translated character sets of a translation language specified by the predetermined language key. The operation device includes a language switch portion and a display character retrieval portion. The language switch portion judges whether or not all of the translated character sets of the translation language specified by the selected language key exist in correspondence with the display character sets of the display language. The display character retrieval portion checks whether or not a same character set as a display character set of the display language corresponding to a missing translated character set of the translation language exists in other display character sets of the display language when the language switch portion judges that not all of the translated character sets of the translation language specified by the selected language key exist. When the display character retrieval portion determines that the same character set as the display character set of the display language exists in the other display character sets of the display language, the language switch portion substitutes another translated character set of the translation language, which corresponds to the same character set that exists in the other display character sets, for the missing translated character set.

Another aspect of the present disclosure is directed to an image forming apparatus that includes the operation device.

A further aspect of the present disclosure is directed to an operation method which, when a user selects a predetermined language key, switches display character sets of a display language displayed on a screen to translated character sets of a translation language specified by the predetermined language key. The operation method includes a first step, a second step and a third step. The first step judges whether or not all of the translated character sets of the translation language specified by the selected language key exist in correspondence with the display character sets of the display language.

The second step checks whether or not a same character set as a display character set of the display language corresponding to a missing translated character set of the translation language exists in other display character sets of the display language when the first step judges that not all of the translated character sets of the translation language specified by the selected language key exist. When the second step determines that the same character set as the display character set of the display language exists in the other display character sets of the display language, the third step substitutes another translated character set of the translation language, which corresponds to the same character set that exists in the other display character sets, for the missing translated character set.

Still a further aspect of the present disclosure is directed to a computer-readable non-transitory storage medium storing a program for causing a computer to execute each step of the operation method.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a functional block diagram of the multifunction peripheral of the present disclosure.

DETAILED DESCRIPTION

The following describes an embodiment of an image forming apparatus including an operation device (operation portion) of the present disclosure and an operation method, with reference to the drawings, for the understanding of the disclosure. It should be noted that the following description is an example of an embodiment of the present disclosure and should not limit the technical scope of the present disclosure. It should also be noted that the alphabet "S", which is put before a numeral in the flowcharts, means "step".

<Image Forming Apparatus Including Operation Portion>

Figure 1:
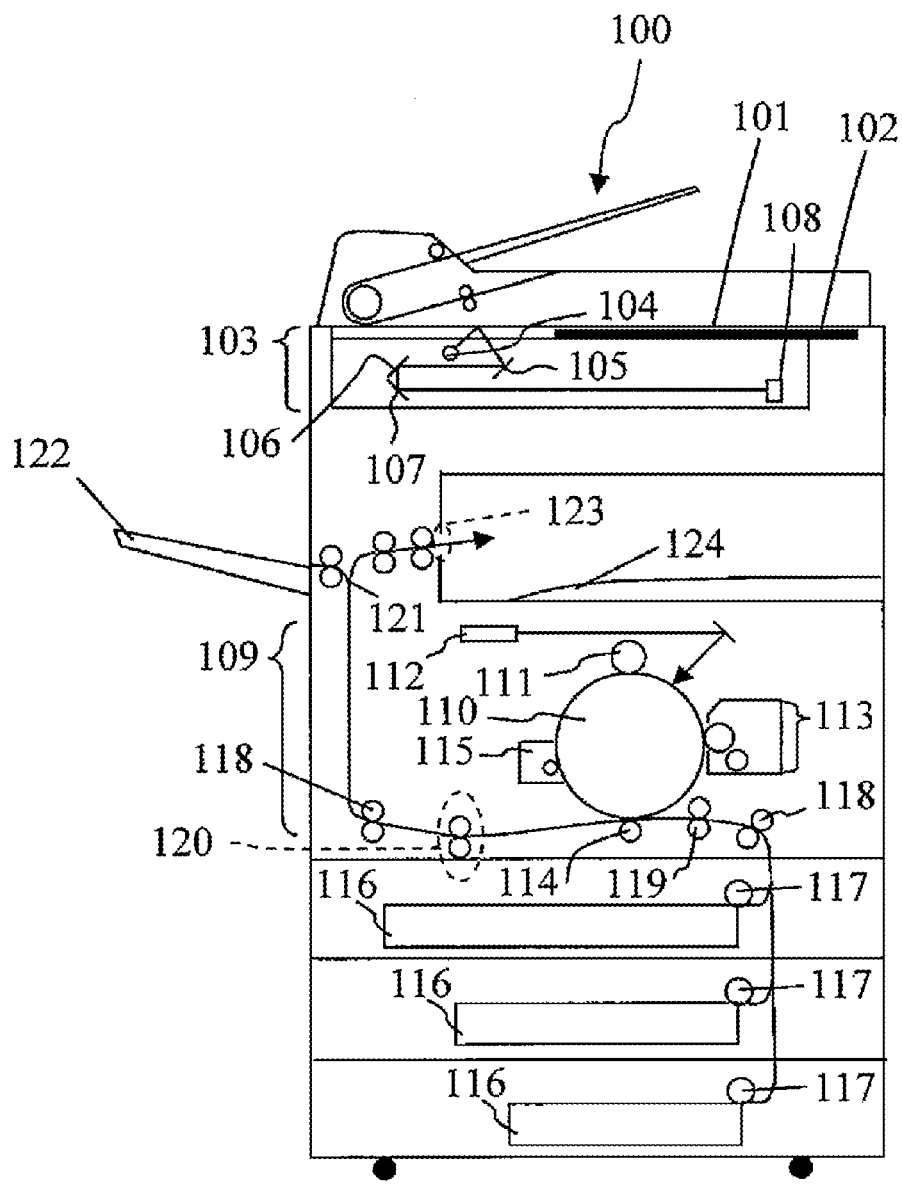
FIG. 1 is a diagram illustrating an image forming apparatus including an operation portion according to the embodiment of the present disclosure.

FIG. 1 is a schematic diagram of an image forming apparatus including an operation portion 102 according to the embodiment of the present disclosure. In FIG. 1, details of portions that are not directly related to the present disclosure are omitted.

Note that the multifunction peripheral 100 including the operation portion 102 of the present disclosure corresponds to a standalone printer or scanner, or an apparatus including a printer, a copier, a scanner, a fax and the like, and is an image forming apparatus including a copy function, scan function, fax function, print function and the like.

The following is a brief explanation of an operation of an MFP (MultiFunction Peripheral) 100 when the copy function is used.

First, a user of the multifunction peripheral 100 places an original sheet on an original table 101 provided on an upper surface of a cabinet. Next, the user uses an operation portion 102 provided near the original table 101 to input setting conditions for image formation, from an operation screen of the operation portion. 102. When the user presses the start key provided in the operation portion 102, the multifunction peripheral 100 starts image formation (print process).

Subsequently, in an image read portion 103, light from a light source 104 is irradiated on the original sheet placed on the original table 101, and light reflected on the original sheet is guided into an imaging element 108 by mirrors 105, 106 and 107. The guided light is converted through the photoelectric conversion performed by the imaging element 108, and image data corresponding to the original sheet is generated.

An image forming portion 109 forms a toner image based on the image data. The image forming portion 109 includes a photosensitive drum 110. The photosensitive drum 110 rotates in a predetermined direction at a constant speed. In order from the upstream side in the rotation direction of the photosensitive drum 110, a charger 111, an exposing portion 112, a developing portion 113, a transfer portion 114, a cleaning portion 115 and the like are provided around the photosensitive drum 110.

The charger 111 charges the surface of the photosensitive drum 110 uniformly. The exposing portion 112 forms an electrostatic latent image by irradiating laser onto the surface of the photosensitive drum 110 based on the image data. The developing portion 113 forms a toner image by causing toner to adhere to the formed electrostatic latent image. The formed toner image is transferred onto a recording medium (for example, a sheet of paper or a sheet of other material) by the transfer portion 114. The cleaning portion 115 removes excessive toner from the surface of the photosensitive drum 110. This series of processes is executed while the photosensitive drum 110 is rotating.

The sheet of paper is transported from one of a plurality of paper feed cassettes 116 provided in the multifunction peripheral 100. For the sheet of paper to be transported, a pick-up roller 117 pulls the sheet of paper from one of the paper feed cassettes 116 onto a transport path. The paper feed cassettes 116 house different types of paper. Each sheet of paper is fed based on the setting conditions for the image formation.

After being pulled onto the transport path, the sheet of paper is fed to a space between the photosensitive drum 110 and the transfer portion 114 by a transport roller 118 and a resist roller 119. In the space between the photosensitive drum 110 and the transfer portion 114, the toner image is transferred onto the sheet of paper, and then the sheet of paper is transported to a fixing device 120.

The sheet of paper with the toner image transferred thereon is caused to pass a space between a heating roller and a pressing roller provided in the fixing device 120. In the space between the heating roller and the pressing roller, the toner image on the sheet of paper receives heat and pressure, and a visible image is fixed on the sheet of paper. The amount of heat given by the heating roller is set to be optimal for each type of paper such that the fixing is performed appropriately. With the visible image having been fixed on the sheet of paper, the image formation process is completed. The sheet of paper is then guided into a path switcher 121 by the transport roller 118.

In accordance with a switch instruction of the multifunction peripheral 100, the path switcher 121 guides the sheet of paper into an ejected paper tray 122 provided on a side of the cabinet, or into an inside tray 124 provided inside the cabinet, via an ejecting opening 123. The sheet of paper is stacked and housed in the ejected paper tray 122 or the inside tray 124. The cabinet of the multifunction peripheral 100 provides the user with the copy function performed in this procedure.

Figure 2:
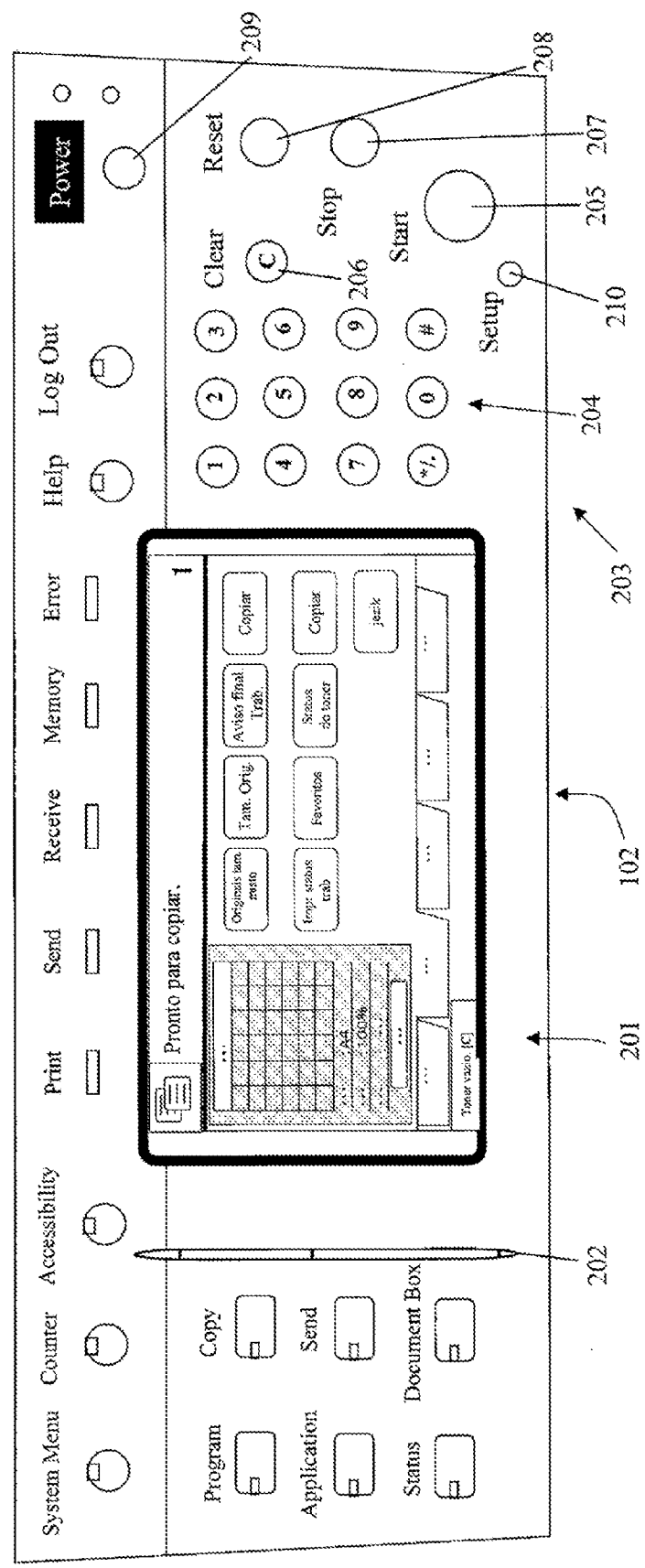
FIG. 2 is a diagram illustrating an overall structure of the operation portion of the present disclosure.

FIG. 2 is a schematic diagram of an overall structure of the operation portion 102 of the present disclosure. Operating the operation portion 102, the user can input the above-described setting conditions for image formation or confirm setting conditions having been input. To input the setting conditions, the user can use a touch panel 201 (operation panel), a touch pen 202, and an operation key 203 provided in the operation portion 102.

The touch panel 201 provides a function to input setting conditions and a function to display the setting conditions. That is to say, when a key in the screen displayed on the touch panel 201 is pressed, a setting condition corresponding to the pressed key is input.

A display portion (not illustrated) such as an LCD (Liquid Crystal Display) is provided on a back surface of the touch panel 201. The display portion displays an operation screen such as an initial screen. The touch pen 202 is provided near the touch panel 201. When the user causes a tip of the touch pen 202 to touch the touch panel 201, a sensor provided under the touch panel 201 detects the location of the touch.

Furthermore, a predetermined number of operation keys 203 are provided near the touch panel 201. The operation keys 203 include, for example, numeric keys 204, a start key 205, a clear key 206, a stop key 207, a reset key 208, a power key 209, and a setup key 210.

Figure 3:
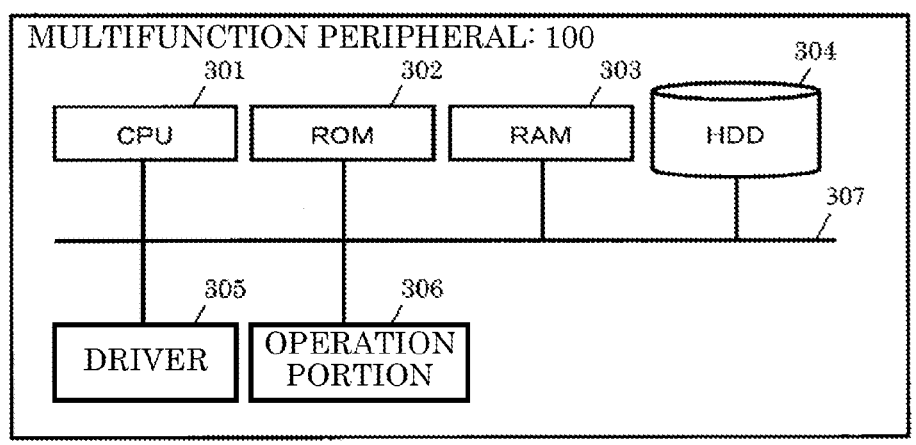
FIG. 3 is a diagram illustrating the structure of the control system hardware of the multifunction peripheral of the present disclosure.

The following explains the structure of control system hardware of the multifunction peripheral 100 with reference to FIG. 3. FIG. 3 illustrates the structure of the control system hardware of the multifunction peripheral 100 of the present disclosure. Note that details of portions that are not directly related to the present disclosure are omitted.

In a control circuit of the multifunction peripheral 100, an internal bus 307 connects to a CPU 301, a ROM 302, a RAM 303, an HDD 304, a driver 305 corresponding to each driving portion, and an operation portion 306 (102).

As one example, the CPU 301 uses the RAM 303 as a work area, and executes programs stored in the ROM 302, the HDD 304 and the like. The CPU 301 receives signals, instructions and the like that correspond to data, specifications, and keys from the driver 305 and the operation portion 306, based on the results of executions of the programs, and controls the operation of each driving portion illustrated in FIG. 1.

Also, with regard to a plurality of functional portions (illustrated in FIG. 4) other than the driving portions, each of the plurality of functional portions is realized when the CPU 301 executes programs. The ROM 302, the HDD 304 and the like store the programs and data that are used to realize each of the plurality of functional portions described in the following.

<Embodiment of Present Disclosure>

Figure 5:
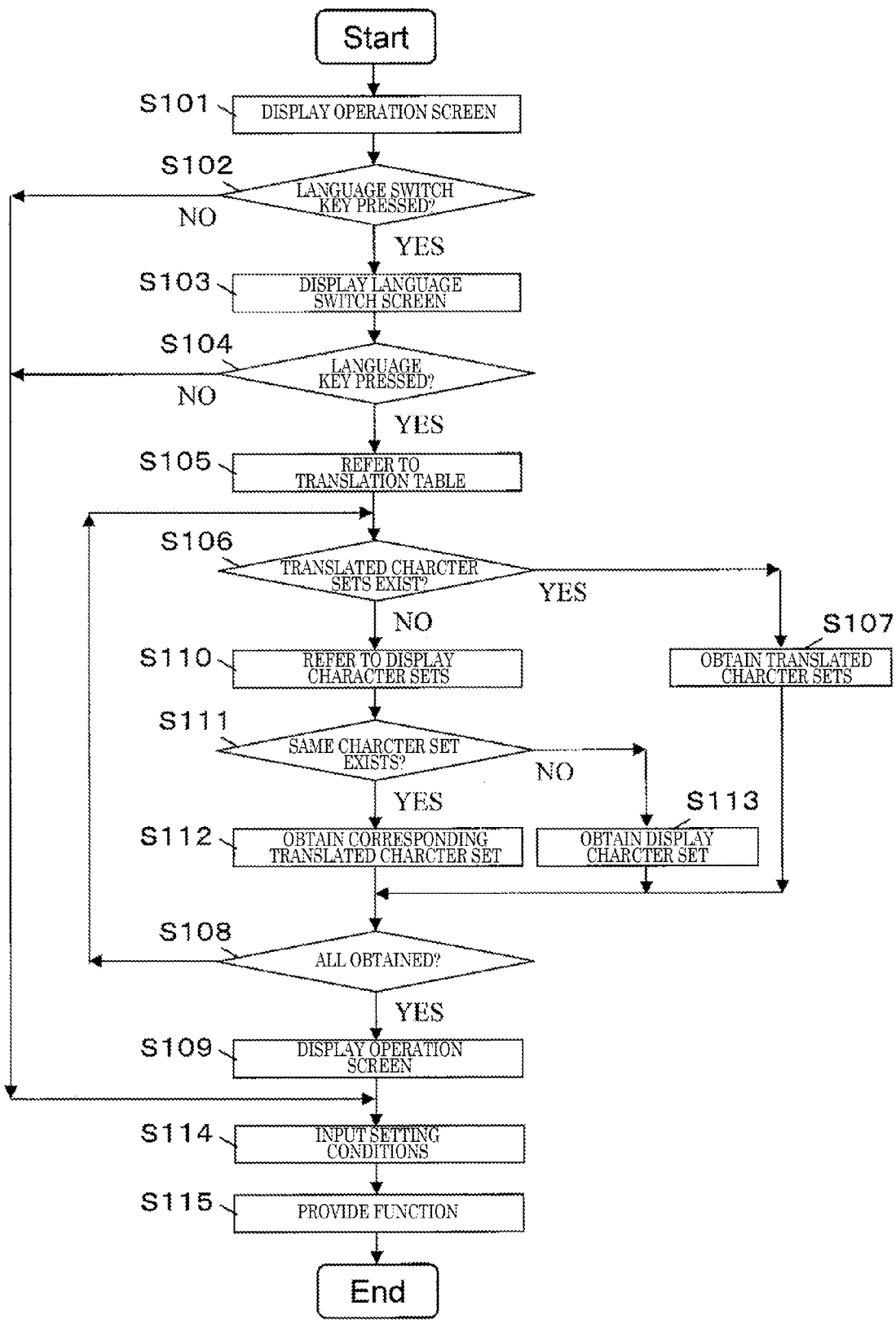
FIG. 5 is a flowchart indicating the execution procedure of the embodiment of the present disclosure.

Here, a structure and an execution procedure of the embodiment of the present disclosure will be described with reference to FIGS. 4 and 5. FIG. 4 is a functional block diagram of the multifunction peripheral in the embodiment of the present disclosure. FIG. 5 is a flowchart indicating the execution procedure of the embodiment of the present disclosure.

When the user applies power to the multifunction peripheral 100, the multifunction peripheral is activated, and a display receiving portion 401 displays an operation screen (initial screen) on the touch panel 201 with a display language (for example, "English") that has been set in advance (S101).

Figure 6A:
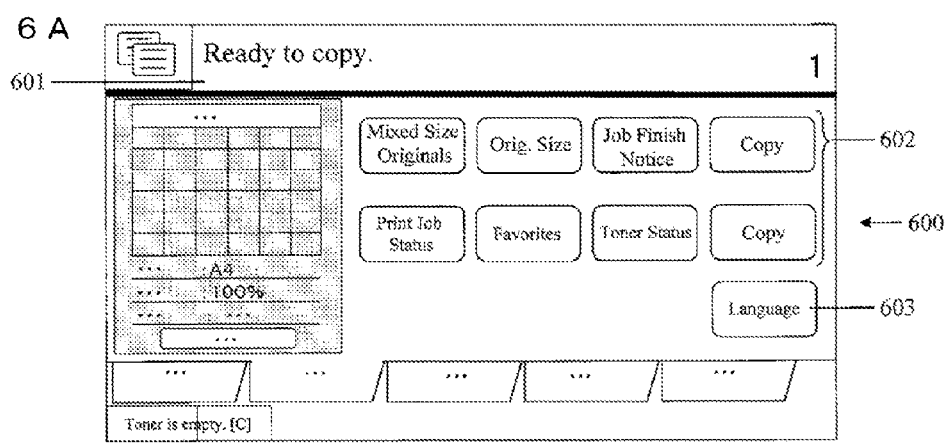
FIG. 6A is a diagram illustrating an example of the operation screen of the display language displayed on the touch panel of the embodiment of the present disclosure.

As illustrated in FIG. 6A, on the operation screen 600, a predetermined message 601 ("Ready to copy."), function item keys 602 used to input setting conditions such as the copy function, and a language switch key 603 ("Language" key) for switching the display language displayed on the screen to another language (translation language), are displayed. In this example, the display character sets (display titles, display names) displayed on the operation screen 600 are represented by the words of English that has been set as the display language.

Here, if the user wants to display character sets of his/her own language on the screen and selects the language switch key 603 (S102 YES), the display receiving portion 401 receives the selection of the language switch key 603 and displays a display language switch screen on the touch panel 201 (S103).

Figure 6B:
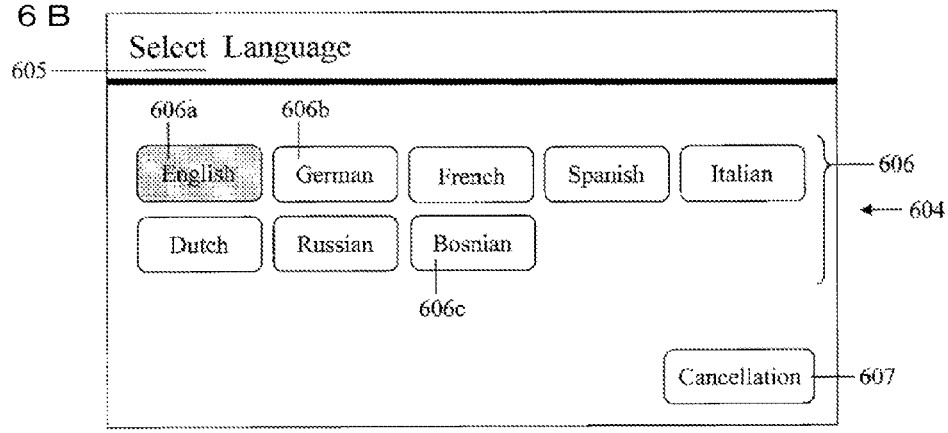
FIG. 6B is a diagram illustrating an example of the language switch screen displayed on the touch panel of the embodiment of the present disclosure.

As illustrated in FIG. 6B, on the language switch screen 604, a predetermined message 605 ("Select language"), a plurality of language keys 606 (for example, "English" key 606a, "German" key 606b, "Bosnian" key 606c, etc.), and a cancellation key 607 ("Cancellation" key) are displayed.

In this example, the language keys 606 indicate respective languages (language names) to which the display language can be switched, by character sets of English that has been set as the display language. For example, in the language key 606a for switching the display language to English, "English" is displayed as the language name; in the language key 606b for switching the display language to German, "German" is displayed as the language name; and the language key 606c for switching the display language to Bosnian, "Bosnian" is displayed as the language name. Note that in this example, the background of the language key 606a is displayed in a color (gray or the like) that is different from the color of the background of the other language keys, and this notifies the user that the language key 606a corresponding to English is selected.

Here, when the user selects a language key 606 from among those displayed on the language switch screen 604, the display receiving portion 401 receives the selection of the language key 606 (S104 YES), and notifies a language switch portion 402 of the selection. The language switch portion 402 switches the display language, whose characters are to be displayed on the screen, from English to the translation language specified by the selected language key 606.

The language switch portion 402 may use any method to switch the display language to the translation language specified by the selected language key 606. The following explains one example of the method.

The language switch portion 402 refers to a language data table stored in a language data storage portion 403 (S105).

Figures 7A, 7B:
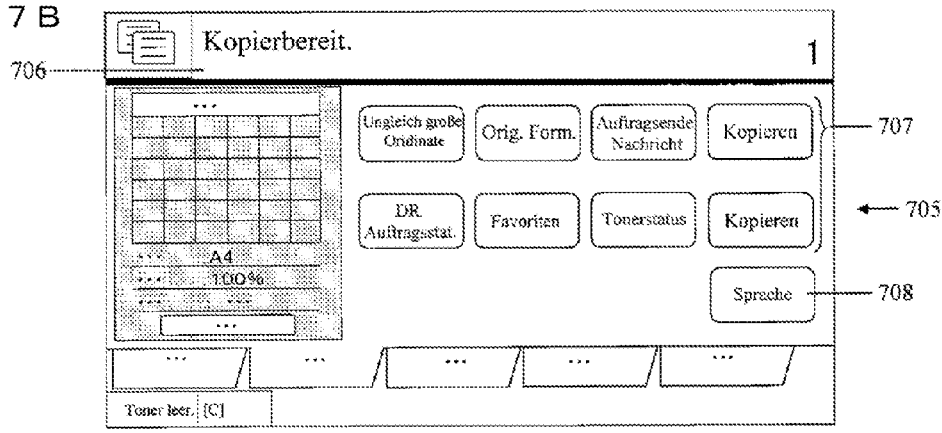
FIG. 7A is a diagram illustrating an example of the language data table of the embodiment of the present disclosure.
FIG. 7B is a diagram illustrating an example of the operation screen of the first translation language displayed on the touch panel of the embodiment of the present disclosure.

As illustrated in FIG. 7A, the language data table 700 stores, in association with each other: a sentence number 701 (for example, "1" in the "Number" column) which is an identifier of a display character set to be displayed on the screen; a display character set 702 (for example, "Ready to copy") that is a character set of English that has been set in advance as the display language; a translated character set 703 (for example, "Kopierbereit.") that is a character set of the first translation language (for example, "German") translated from the display character set 702 of English; and a translated character set 704 (for example, "Pronto para copiar.") that are a character set of the second translation language (for example, "Bosnian") translated from the display character set 702 of English.

It should be noted that, in the language data table 700, although two types of translated character sets 703 and 704 are provided in correspondence with the display character set 702 of English for the sake of understanding of the present disclosure, as many translated character sets as the language keys 606 displayed on the language switch screen 604 are stored in correspondence with the display character set 702.

Also, for the first translation language, all translated character sets 703 corresponding to the display character set 702 of the display language English exist. On the other hand, for the second translation language, a part (for example, a translated character set 704a in the lowest row) of translated character sets 704 corresponding to the display character sets 702 of the display language English is missing. This is because, for example, the second translation language is an optional translation language and new language data corresponding to an additional function has not been installed in correspondence with a renewal of the display language.

Here, the language switch portion 402, by referring to the language data table 700, judges whether or not a translated character set of the translation language specified by the selected language key 606 exists in correspondence with a display character set 702 of the display language English (S106).

When it is judged that the translated character set of the translation language specified by the selected language key 606 exists in correspondence with the display character set 702 of the display language English (S106 YES), the language switch portion 402 obtains the translated character set of the translation language judged to exist (S107). The obtained translated character set is to replace the display character set when the display language is switched to the translation language.

Subsequently, the language switch portion 402 judges whether or not all the translated character sets of the translation language corresponding to the display character sets 702 of the display language English have been obtained (S108).

In this example, when the language key 606 selected by the user is the "German" key 606b, all the translated character sets 703 of the translation language corresponding to the display character sets 702 of the display language English exist (S106 YES->S107). As a result, the language switch portion 402 obtains each of the translated character sets 703 of the translation language repeatedly in correspondence with each of the display character sets 702. Then when the language switch portion 402 judges in S108 that all the translated character sets 703 of the translation language corresponding to the display character sets 702 of the display language English have been obtained (S108 YES), the language switch portion 402 sends a notification of the obtainment to the display receiving portion 401. Upon receiving the notification, the display receiving portion 401 displays an operation screen of the first translation language (for example, "German") by using the obtained translated character sets 703, on the touch panel 201 (S109).

As illustrated in FIG. 7B, on the operation screen 705, a predetermined message "Kopierbereit." 706 (a translation of "Ready to copy.") of the translation language "German"; function item keys 707 of the translation language "German" used to input setting conditions, such as the copy function; and a language switch key 708 ("Sprache" key) for switching the display language displayed on the screen to another language (translation language), are displayed.

With this structure, it is possible for the user to display the contents of the screen by using the translated characters of a desired translation language, and to input a desired setting condition.

On the other hand, when the language switch portion 402 judges in S106 that a translated character set of the translation language specified by the selected language key 606 does not exist in correspondence with the display character set 702 of the display language English (S106 NO), the process goes as described in the following.

That is to say, when the language 606 selected by the user is Bosnian as specified by the "Bosnian" key 606c, a part of translated character sets 704 of the translation language corresponding to the display character sets 702 of the display language English does not exist. As a result, when the language switch portion 402 attempts to obtain each of the translated character sets 704 of the translation language repeatedly in correspondence with each of the display character sets 702, the language switch portion 402 detects a translated character set 704 that does not exist (for example, a translated character set 704a in the lowest row, which is in reality a blank space). This case corresponds to a case where a translated character set 704 of the translation language specified by the selected language key 606 does not exist (S106 NO). The language switch portion 402 sends a notification of this to a display character retrieval portion 404. Upon receiving the notification, the display character retrieval portion 404 checks whether or not the same character set as the display character set 702 of the display language corresponding to the missing translated character set 704a exists in the other display character sets 702 of the display language.

The display character retrieval portion 404 may use any method to check whether or not the same character set as the display character set 702 of the display language corresponding to the missing translated character set 704a exists in the other display character sets 702 of the display language. The following explains one example of the method.

That is to say, first the display character retrieval portion 404 refers to the language data table 700, and refers to the display character set 702 (in this example, "Copy") of the display language corresponding to the missing translated character set 704a (a blank space) of the translation language (S110). Then the display character retrieval portion 404 compares the display character set 702 "Copy" with the other display character sets 702 of the display language to determine whether or not the same character set as the display character set 702 "Copy" exists in the other display character sets 702 of the display language (S111).

It should noted that the same character set as the display character set "Copy" may be determined to exist in the other display character sets 702 of the display language if the display character set "Copy" is included, as a part, in the other display character sets 702. However, the present embodiment explains a case where the same character set as the display character set "Copy" is determined to exist in the other display character sets 702 of the display language if the display character set "Copy" matches completely with one of the other display character sets 702, for the sake of improving the translation accuracy.

When it is determined that the same character set as the display character set 702 exists in the other display character sets 702 of the display language (S111 YES), the display character retrieval portion 404 sends a notification of this to the language switch portion 402. Upon receiving the notification, the language switch portion 402 obtains another translated character set 704 of the translation language that corresponds to the same character set as the display character set 702 that exists in the other display character sets 702, as a substitute for the translated character set 704a (a blank space) of the translation language that has been judged not to exist (S112).

For example, in the language data table 700, the display character set 702 of the display language corresponding to the translated character set 704a (a blank space) that is judged not to exist is "Copy" 702a. This character set, "Copy", also exists in another character set 702b (for example, "Copy" 702b associated with "5" in the sentence number 701). As a result, another translated character set 704b "Copiar" of the translation language that corresponds to the same character set as the display character set 702 "Copy" is regarded as the translated character set 704a (a blank space) of the translation language that has been judged not to exist. Thus the language switch portion 402 obtains the other translated character set 704b "Copiar", as the translated character set 704a (a blank space) of the translation language that has been judged not to exist.

With this structure, even if a translated character set 704a is missing in the language data stored in the language data table 700, an existing translated character set 704b can be substituted for the missing translated character set 704a. This makes it possible to cover a missing translated character set. In particular, a same display character set may be used in many areas in the operation portion for which a plurality of languages are provided for use by switching. It is therefore possible to use this characteristic to easily cover a missing translated character set based on the commonality among display character sets of languages. That is to say, it is possible to use the characteristic that a same character set exists in many different display areas on the screen.

Also, such a substitution is particularly effective in the case where the language specified by the language key 606 selected by the user is an optional translation language that is not supported unless the user, such as the administrator, reinstalls the translated character sets when the screen of the operation portion is renewed for additional functions. This is because the user, such as the administrator, often forgets to reinstall the language data of the optional translation languages that have been renewed.

As described above, after obtaining the translated character set 704, the language switch portion 402 judges in S108 whether or not all the translated character sets of the translation language corresponding to the display character sets 702 of the display language English have been obtained (S108).

When the language switch portion 402 judges that all the translated character sets of the translation language have not been obtained (S108 NO), the control returns to S106 to judge whether or not another translated character set of the translation language specified by the selected language key 606 exists in correspondence with another display character set 702 of the display language English (S106).

On the other hand, when the language switch portion 402 judges that all the translated character sets of the translation language have been obtained (S108 YES), the display receiving portion 401 displays an operation screen of the second translation language (for example, "Bosnian") by using the obtained translated character sets 704, on the touch panel 201 (S109).

Figure 8A:
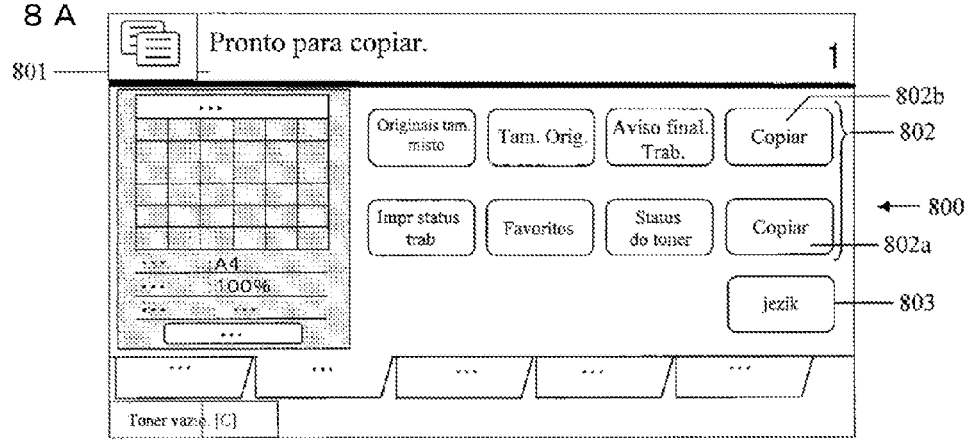
FIG. 8A is a diagram illustrating an example of the operation screen of the second translation language displayed on the touch panel of the embodiment of the present disclosure.

As illustrated in FIG. 8A, on the operation screen 800, a predetermined message "Pronto para copiar." 801 (a translation of "Ready to copy.") of the translation language "Bosnian"; function item keys 802 of the translation language "Bosnian" used to input setting conditions, such as the copy function; and a language switch key 803 ("jezik" key) for switching the display language displayed on the screen to another language (translation language), are displayed.

Here, among the translated character sets displayed in the function item keys 802, the translated character set 802a of the translation language that has been judged not to exist is replaqced by another translated character set 802b "Copiar" that corresponds to the same character set as the display character set "Copy" of the display language.

With this structure, even when a corresponding translated character set 704a is missing, another translated character set 704b can be substituted for the missing translated character set 704a. This makes it possible for the user to confirm the contents of the screen by the translation language without feeling uncomfortable.

On the other hand, when it is determined in S111 that the same character set as the display character set 702 does not exist in the other display character sets 702 of the display language (S111 NO), the display character retrieval portion 404 sends a notification of this to the language switch portion 402. Upon receiving the notification, the language switch portion 402 obtains the display character set 702 of the display language corresponding to the translated character set 704a (a blank space) of the translation language that has been judged not to exist, as the translated character set 704a (a blank space) of the translation language (S113).

For example, when the display character set 702 of the display language corresponding to the translated character set 704a (a blank space) of the translation language that has been judged not to exist is "Paper", the same character set as the display character set 702 of the display language corresponding to the missing translated character set 704a does not exist in the other display character sets 702 of the display language in the language data table 700. In this case, an alternative measure is taken. That is to say, the language switch portion 402 obtains the display character set 702 "Paper" of the display language corresponding to the translated character set 704a (a blank space) of the translation language that has been judged not to exist, as the translated character set 704a (a blank space) of the translation language.

Then when the language switch portion 402 judges that all the translated character sets of the translation language have been obtained (S108 YES), the display receiving portion 401 displays an operation screen of the second translation language ("Bosnian") by using the obtained translated character sets 704, on the touch panel 201 (S109).

Figure 8B:
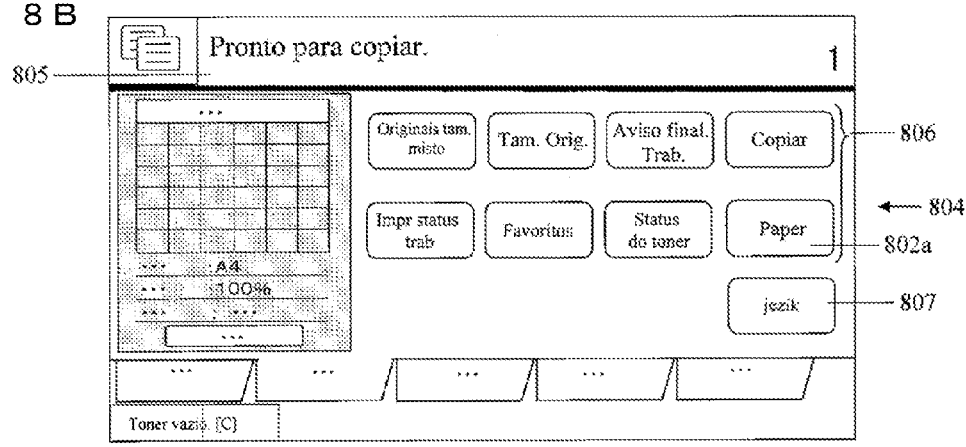
FIG. 8B is a diagram illustrating an example of the operation screen of the second translation language displayed on the touch panel of the embodiment of the present disclosure.

As illustrated in FIG. 8B, on the operation screen 804, a predetermined message "Pronto para copiar." 805 (a translation of "Ready to copy.") of the translation language "Bosnian"; function item keys 806 of the translation language "Bosnian" used to input setting conditions, such as the copy function; and a language switch key 807 ("jezik" key) for switching the display language displayed on the screen to another language (translation language), are displayed.

Here, in a function item key 806a in which the translated character set 704a of the translation language does not exist, the display character set "Paper" of the display language corresponding to the translated character set 704a is displayed.

With this structure, even when a missing translated character set cannot be covered by an existing translated character set, a display character set of the standard display language is displayed instead. This makes it possible for the user to input setting conditions without being bewildered by a missing translated character set (display character set).

Subsequently, when the user selects a function item key on the operation screen and inputs predetermined setting conditions, the display receiving portion 401 receives the setting conditions (S114). Then when the user selects the start key 205, the display receiving portion 401 receives the selection of the start key 205, and sends a notification of the selection to a function providing portion 405. Upon receiving the notification, the function providing portion 405 provides the function based on the setting conditions (S115). This enables the user to switch the display language and easily realize the execution of a desired function.

When the user does not select the language switch key 603 in S102 (S102 NO), and selects the cancellation key 607 (S104 NO), the display receiving portion 401 receives the setting conditions input by the user on the operation screen 600 (S114).

With the structure of the operation portion 102 described above, when it is determined that the same character set as the display character set 702 exists in the other display character sets 702 of the display language, the language switch portion 402 substitutes another translated character set 704 of the translation language, which corresponds to the display character set 702 of the display language, for the translated character set 704a (a blank space) of the translation language that has been judged not to exist. With this structure, even when a corresponding translated character set 704a is missing, an existing translated character set of the translation language can be substituted for the missing translated character set.

In the embodiment of the present disclosure, when it is determined that the same character set as the display character set 702 exists in the other display character sets 702 of the display language, the language switch portion 402 substitutes another translated character set 704 of the translation language, which corresponds to the display character set 702 of the display language, for the translated character set 704a (a blank space) of the translation language that has been judged not to exist. The present disclosure is not limited to this structure, but may have other structures. For example, when the other translated character set 704a includes as many characters as cannot be housed in the display area in which the missing translated character set is to be housed, an alternative measure may be taken. More specifically, the language switch portion 402 may substitute the display character set 702 "Copy" of the display language, which corresponds to the translated character set 704a (a blank space) of the translation language that has been judged not to exist, for the translated character set 704a (a blank space) of the translation language that has been judged not to exist. This makes it possible to prevent the translated character set displayed on the screen from extending outside the display area, thereby preventing the user from feeling uncomfortable.

In the present disclosure, the operation portion 102 is applied to the multifunction peripheral 100. However, the same acts and effects are provided when the present disclosure is applied to any type of image forming apparatus, any type of image processing apparatus, any type of image working apparatus, and any type of image display apparatus that include the operation portion 102 (operation device) with the touch panel.

Furthermore, in the embodiment of the present disclosure, the multifunction peripheral 100 includes a plurality of functional portions. However, the operation portion 102 may be structured to include the plurality of functional portions. Also, a program for realizing the plurality of functional portions may be stored in a storage medium, and the storage medium may be provided. In this structure, the program may be caused to be read by the multifunction peripheral 100 or the operation portion 102, and the multifunction peripheral 100 or the operation portion 102 may realize the plurality of functional portions. In that case, the program itself read from the storage medium provides the acts and effects of the present disclosure. Furthermore, the present disclosure may be provided as a method for storing the steps to be executed by the plurality of functional portions into a hard disk.

As described above, the operation device and the operation method of the present disclosure are applicable to the operation portion, as well as to a multifunction peripheral, a copier, a printer and the like having the operation portion, are applicable to a multifunction peripheral, as well as to a scanner, a copier, a printer and the like, and are effective as the operation device and the operation method which, even if a translated character set is missing, can substitute an existing translated character set for the missing translated character set.

It is to be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An operation device for, when a user selects a predetermined language key, switching display character sets of a display language displayed on a screen to translated character sets of a translation language specified by the predetermined language key, the operation device comprising:
   a language switch portion configured to judge whether or not all of the translated character sets of the translation language specified by the selected language key exist in correspondence with the display character sets of the display language; and
   a display character retrieval portion configured to check whether or not a same character set as a display character set of the display language corresponding to a missing translated character set of the translation language exists in other display character sets of the display language when the language switch portion judges that not all of the translated character sets of the translation language specified by the selected language key exist, wherein
   when the display character retrieval portion determines that the same character set as the display character set of the display language exists in the other display character sets of the display language, the language switch portion substitutes another translated character set of the translation language, which corresponds to the same character set that exists in the other display character sets, for the missing translated character set.

2. The operation device according to claim 1, wherein
   when the display character retrieval portion determines that the same character set as the display character set of the display language does not exist in the other display character sets of the display language, the language switch portion substitutes the display character set of the display language, which corresponds to the missing translated character set of the translation language, for the missing translated character set.

3. The operation device according to claim 1, wherein the translation language specified by the selected language key is an optional translation language that is not supported unless the user reinstalls translated character sets when a screen of the operation device is renewed for additional functions.

4. An image forming apparatus comprising the operation device recited in claim 1.

5. An operation method for, when a user selects a predetermined language key, switching display character sets of a display language displayed on a screen to translated character sets of a translation language specified by the predetermined language key, the operation method comprising:
  a first step of judging whether or not all of the translated character sets of the translation language specified by the selected language key exist in correspondence with the display character sets of the display language;
  a second step of checking whether or not a same character set as a display character set of the display language corresponding to a missing translated character set of the translation language exists in other display character sets of the display language when the judging step judges that not all of the translated character sets of the translation language specified by the selected language key exist; and
  a third step of, when the second step determines that the same character set as the display character set of the display language exists in the other display character sets of the display language, substituting another translated character set of the translation language, which corresponds to the same character set that exists in the other display character sets, for the missing translated character set.

6. A computer-readable non-transitory storage medium storing a program for causing a computer to execute each step of the operation method recited in claim 5.

* * * * *